(12) United States Patent
Kagaya

(10) Patent No.: US 7,630,630 B2
(45) Date of Patent: Dec. 8, 2009

(54) PERSON IMAGE CORRECTION APPARATUS, METHOD, AND PROGRAM

(75) Inventor: Makoto Kagaya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 375 days.

(21) Appl. No.: 11/529,439

(22) Filed: Sep. 29, 2006

(65) Prior Publication Data
US 2007/0071440 A1 Mar. 29, 2007

(30) Foreign Application Priority Data
Sep. 29, 2005 (JP) ............................. 2005-283713

(51) Int. Cl.
G03D 13/00 (2006.01)
G06K 9/00 (2006.01)
(52) U.S. Cl. ....................... 396/661; 382/118
(58) Field of Classification Search ................ 382/118, 382/170, 190; 396/661
See application file for complete search history.

(56) References Cited

U.S. PATENT DOCUMENTS

| 5,463,470 | A | | 10/1995 | Terashita et al. | |
|---|---|---|---|---|---|
| 5,467,168 | A | * | 11/1995 | Kinjo et al. | 355/77 |
| 5,629,752 | A | | 5/1997 | Kinjo | |
| 5,818,457 | A | * | 10/1998 | Murata et al. | 345/629 |
| 6,798,921 | B2 | * | 9/2004 | Kinjo | 382/282 |
| 7,170,632 | B1 | * | 1/2007 | Kinjo | 358/1.9 |
| 7,221,809 | B2 | * | 5/2007 | Geng | 382/280 |
| 2004/0008873 | A1 | | 1/2004 | Sogo et al. | |
| 2005/0129326 | A1 | * | 6/2005 | Matama | 382/254 |
| 2007/0071317 | A1 | * | 3/2007 | Kubo et al. | 382/167 |
| 2007/0122034 | A1 | * | 5/2007 | Maor | 382/181 |

FOREIGN PATENT DOCUMENTS

| JP | 05-100328 A | 4/1993 |
|---|---|---|
| JP | 6-208178 A | 7/1994 |
| JP | 08-122944 A | 5/1996 |
| JP | 2000-182043 A | 6/2000 |
| JP | 2000-196890 A | 7/2000 |
| JP | 2003-346149 A | 12/2003 |

* cited by examiner

Primary Examiner—Rodney E Fuller
(74) Attorney, Agent, or Firm—Sughrue Mion, PLLC

(57) ABSTRACT

A person image correcting apparatus, a person image correcting method, and a person image correcting program that allow reproducing face colors of a plurality of images on which persons are photographed, with appropriate colors and densities, and performing appropriate correction for the entirety of the images, regardless of whether the plurality of images are shot under identical shooting conditions or under different shooting conditions, are proposed. The person image correcting apparatus includes a face region extracting unit for extracting a face region from the plurality of person images that are inputted, an identical shooting condition determining unit for determining whether or not the plurality of person images are shot under identical shooting conditions, and an image correcting unit for correcting at least one of color and density of the person images based on a result of determination of the identical shooting condition determining unit.

14 Claims, 5 Drawing Sheets

PERSON IMAGE CORRECTION APPARATUS, METHOD, AND PROGRAM

The entire contents of documents cited in this specification are incorporated herein by reference.

BACKGROUND OF THE INVENTION

The present invention generally relates to image processing technologies. More particularly, the invention relates to image correcting apparatuses, methods and programs that correct images on which persons are photographed.

In preparing photo prints from digital image data, which is, for example, acquired by photo shooting with a digital camera, or obtained by photo-reading of an image printed on a photo film, correction may be performed on the images so that the images are reproduced with appropriate colors and densities. In particular, when it comes to images on which persons are photographed, it is significantly important to reproduce face colors appropriately.

There have been known image processing methods that place an importance on skin colors of persons, including, for example, a technology (refer to JP 2000-196890 A, for instance) in which a person face is automatically extracted from image data and the data is corrected so that a skin color of the face area achieves a target range of density, and a technology (refer to JP 2000-182043 A, for instance) in which a skin color of the face area achieves target chromaticity. In these technologies, a target density and/or a target chromaticity of skin colors are pre-set and the images are corrected respectively in such a manner that the density and/or color of the face regions extracted from the image data are close to the target values.

However, considering that different persons from different races have different skin colors, there may be problems if a certain color and/or density is used as a akin color target for correcting all the images of an image group, when the images include different persons from a plurality of races and are shot under identical shooting conditions (such as class book photos). For example, there may be inconsistency in background colors among the images or skin color tint may not always be appropriately reproduced. Therefore, it is desirable to perform identical correction to an image group consisting of such a plurality of images.

In JP 6-208178 A, on the other hand, a photo printing method, in which, a printing exposure amount for a plurality of frame images is determined based on an average value of measured light values, and the determined printing exposure amount is used to print the plurality of frames onto printing paper is described. In this method, since a same printing exposure amount is used to print the plurality of frames, inconsistency in background colors among the images shot under identical shooting conditions can be prevented.

However, on the contrary, in case where skin colors are varied due to different shooting conditions, there may be some frames in which skin colors are not reproduced appropriately.

SUMMARY OF THE INVENTION

In view of the above problems, it is an object of the present invention to solve the problems and to provide a person image correcting apparatus, a person image correcting method, and a person image correcting program that allow reproducing face colors of a plurality of images on which persons are photographed, with appropriate colors and densities, and performing appropriate correction for the entirety of the images, regardless of whether the plurality of images are shot under identical shooting conditions or under different shooting conditions.

In order to solve the above problems, the present invention provides a person image correcting apparatus for correcting a plurality of person images, the person image correcting apparatus including:

a face region extracting unit for extracting a face region from the plurality of person images that are inputted;

an identical shooting condition determining unit for determining whether or not the plurality of person images are shot under identical shooting conditions; and an image correcting unit for correcting at least one of color and density of the person images using information of the face region extracted by the face region extracting unit based on a result of determination of the identical shooting condition determining unit.

Preferably, the identical shooting condition determining unit includes:

an identical person identifying unit for identifying an identical person among persons shot on the plurality of person images; and a feature amount similarity calculating unit for calculating a feature amount similarity of the identical person identified by the identical person identifying unit, in which, the identical shooting condition determining unit determines, based on the feature amount similarity calculated by the feature amount similarity calculating unit, whether or not the plurality of person images are shot under identical shooting conditions.

Preferably, if the determination indicates that the plurality of person images are shot under identical shooting conditions, the image correcting unit corrects all of the plurality of person images with an identical correction amount and if the determination indicates that the plurality of person images are not shot under identical conditions, the image correcting unit corrects the respective plurality of person images with respective correction amounts.

In order to solve the above problems, the present invention also provides a person image correcting method including the steps of:

extracting a face region from a plurality of person images that are inputted, determining whether or not the plurality of person images are shot under identical shooting conditions, and correcting at least one of color and density of the person images, by using information of the extracted face region, based on a result of the determining step.

Preferably, the determining step includes:

identifying an identical person among persons shot on the plurality of person images;

calculating a feature amount similarity of the identified identical person; and performing determination based on the calculated feature amount similarity.

Preferably, if the determination indicates that the plurality of person images are shot under identical shooting conditions, all of the plurality of person images are corrected with an identical correction amount and if the determination indicates that the plurality of person images are not shot under identical conditions, the respective plurality of person images are corrected with respective correction amounts.

In order to solve the above problems, the present invention also provides a person image correcting program for allowing a computer to serve as a face region extracting unit for extracting a face region from the plurality of person images that are inputted;

an identical shooting condition determining unit for determining whether or not the plurality of person images are shot under identical shooting conditions; and an image correcting unit for correcting at least one of color and density of the person images using information of the face region extracted by the face region extracting unit based on a result of determination of the identical shooting condition determining unit.

In order to solve the above problems, the present invention also provides a person image correcting program for allowing a computer to perform extracting a face region from a plurality of person images that are inputted, determining whether or not the plurality of person images are shot under identical shooting conditions, and correcting at least one of color and density of the person images, by using information of the extracted face region, based on a result of the determining step.

As described above, the present invention allows, reproducing face colors of a plurality of images on which persons are photographed, with appropriate colors and densities, and performing appropriate correction for the entirety of the images, regardless of whether the plurality of images are shot under identical shooting conditions or under different shooting conditions.

DETAILED DESCRIPTION OF THE INVENTION

The person image correcting apparatus, the person image correcting method and the person image correcting program according to the present invention will be described in detail with reference to preferred embodiments shown in the attached drawings.

Figure 1:
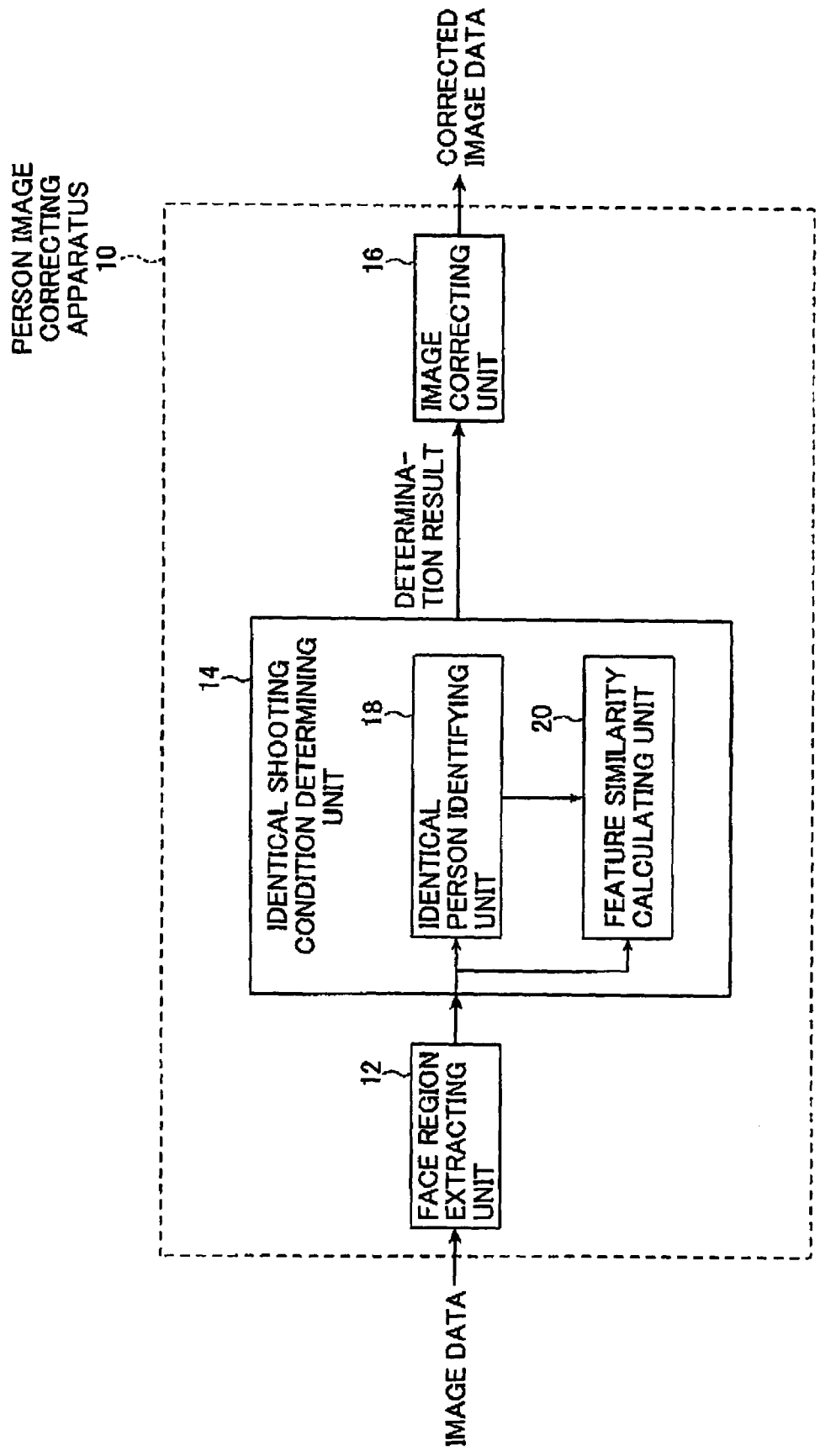
FIG. 1 is a block diagram showing an embodiment of the person image correcting apparatus of the present invention.

FIG. 1 is a block diagram showing an embodiment of the person image correcting apparatus of the present invention.

A person image correcting apparatus 10 shown in FIG. 1 determines whether the plurality of person images (image data) that are inputted are shot under identical shooting conditions or not, selects a suitable correction mode according to a result of the determination, corrects color and density of the person images, and outputs the person images that have been corrected (corrected image data).

The person image correcting apparatus 10 has a face region extracting unit 12, an identical shooting condition determining unit 14, and an image correcting unit 16.

The person image correcting apparatus 10 can be achieved by having a computer execute the person image correcting program according to the present invention. In other words, the person image correcting program of the present invention allows the computer to serve as the face region extracting unit 12, the identical shooting condition determining unit 14, and the image correcting unit 16.

Further, a portion or the entirety of the components of the person image correcting apparatus 10 may be configured by hardware capable of executing predetermined computing processing.

The person image correcting apparatus 10 is directly or indirectly connected to such as an image input device and a print order receiving device (hereinafter collectively referred to as the image input device). The image input device is generally equipped with a media driver for reading image data from various media on which image data acquired through photo-shooting by such as digital cameras is recorded, a network connection device for obtaining image data through communication lines such as Internet, a terminal for directly connecting to digital photo-shooting devices such as digital cameras and mobile phones equipped with a camera, and a scanner for obtaining image data by photoelectrically reading the images shot on photo-film. The image input device is used for obtaining a plurality of photo images (image data) as one unit, for example, a lot order for printing.

The face region extracting unit 12 extracts face regions from the respective plurality of person images that are inputted.

The identical shooting condition determining unit 14 is employed for determining whether or not the plurality of person images that are inputted are shot under identical shooting conditions. The identical shooting condition determining unit 14 preferably has an identical person identifying unit 18 and a feature amount similarity calculating unit 20.

The identical person identifying unit 18 identifies an identical person among the persons photographed on the plurality of person images, based on information of the face region extracted by the face region extracting unit 12.

The feature amount similarity calculating unit 20 calculates feature amount similarity for the person identified as the identical person by the identical person identifying unit 18.

The identical shooting condition determining unit 14 determines, based on the feature amount similarity of the identical person calculated by the feature amount similarity calculating unit 20, whether or not the inputted plurality of images are shot under identical shooting conditions.

The image correcting unit 16 selects a mode for correcting color and density based on a result of determination from the identical shooting condition determining unit 14, and corrects color and density of the inputted person images using the information of the face region extracted by the face region extracting unit 12 so that the face regions become appropriate in terms of color and density.

Specifically, the image correcting unit 16 corrects all of the plurality of person images with an identical correction amount if the identical shooting condition determining unit 14 determines that the plurality of person images are shot under identical shooting conditions, and corrects the respective plurality of person images with respective appropriate correction amounts if the identical shooting condition determining unit 14 determines that the plurality of person images are not shot under identical conditions, and then generates the corrected person images.

Figure 2:
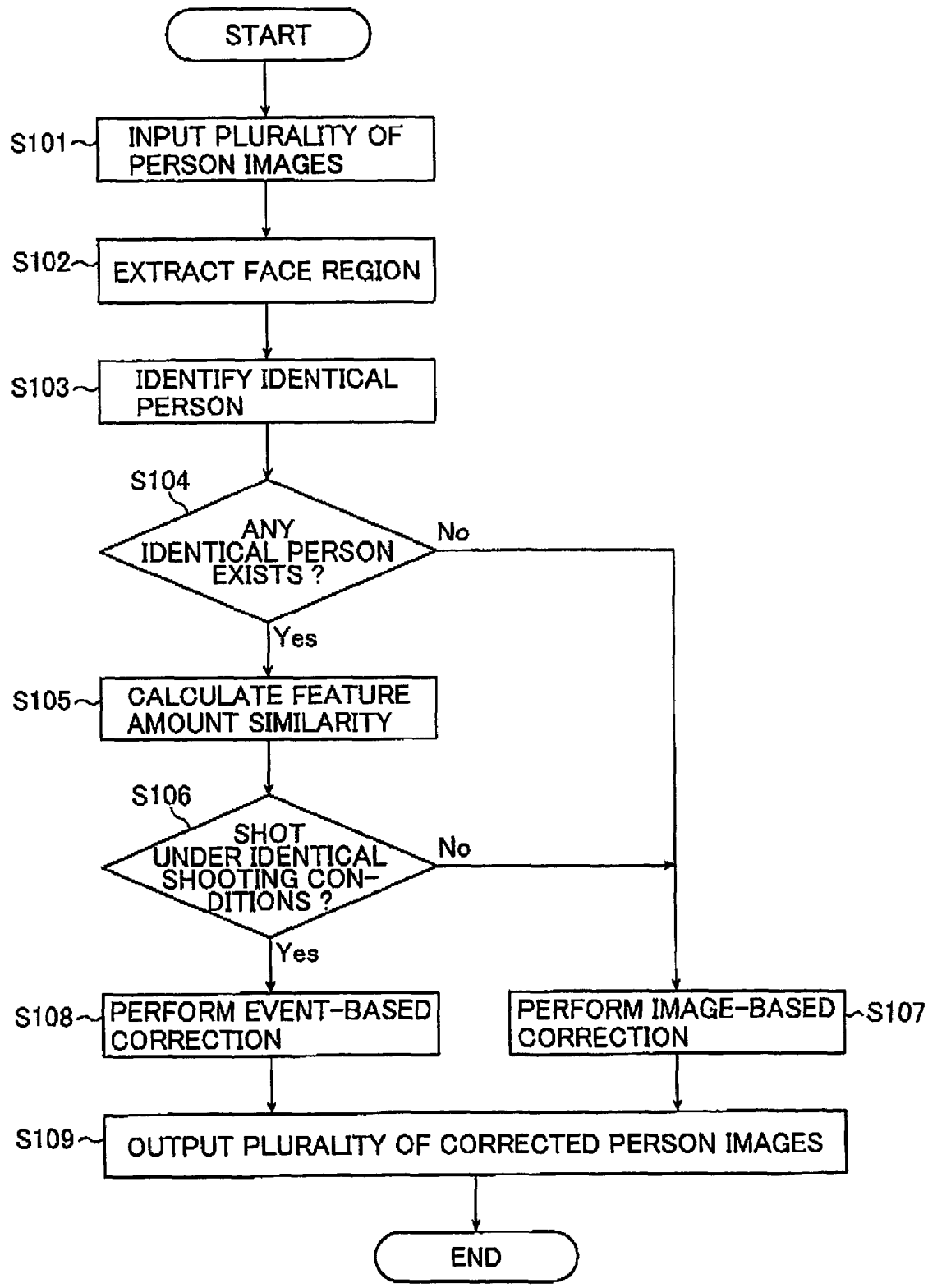
FIG. 2 is a flow chart of person image correcting processes performed in the person image correcting apparatus of FIG. 1.

Person image correcting processes performed in the person image correcting apparatus 10 will be described below according to the flow chart shown in FIG. 2. Also operation of each components of the person image correcting apparatus 10 will be described.

The person image correcting apparatus 10, when a plurality of person images are inputted in the face region extracting unit 12 (step S101), extracts face regions from the respective plurality of person images through the face region extracting unit 12 (step S102).

There is no limitation on methods for extracting face regions. There are various known methods of extracting face regions, such as a method in which a region of pixels that fall within a range of skin colors is extracted as the face region, and a method that uses shape pattern retrieval. Examples of methods that can be employed for extracting face regions include a method described in JP 8-122944 A in which a color original image is segmented based on a histogram of hue values, and from the segmented regions, face regions are selected based on such as camera information, and a method described in JP 5-100328 A in which face regions are determined by detecting shape patterns of such as head contour or face contour of the persons on the image.

Subsequently, the identical person identifying unit 18 of the identical shooting condition determining unit 14 retrieves the inputted plurality of person images to determine whether an identical person is included in the plurality of person images, and identify the identical person if any (step S103).

Known face authentication technologies may be used without limitation for identifying an identical person. For example, a method described in JP 2003-346149 may be used, in which a plurality of face images are stored previously, and acquired face images are verified with the stored face images to identify any identical persons. In this method, it is necessary to previously store data for verification of individuals. However, such data can be obtained by for example, storing a sufficient amount of data in a memory unit (not shown) as a database in the person image correcting apparatus 10, and retrieving as necessary. Alternatively, verification data suitable for each event may be prepared or acquired on an each event basis and stored in the person image correcting apparatus 10 (memory unit thereof). For example, if the images to be corrected are images of students of a school, a face image database of the students of the school may be prepared and stored in the person image correcting apparatus 10 before performing image correction.

In addition, in this embodiment, for the purpose of identifying identical persons, it is sufficient if the faces of identical persons that are included in a plurality of images are identified. Therefore, instead of storing template face images of certain persons, pattern matching may be used, in which patterns of faces in the plurality of images are analyzed and pattern matching is performed across the plurality of images so as to identify faces of identical persons The identical person identifying unit 18, then determines, from the result of the above identical person identification, whether any identical persons exist or not (step S104).

If no identical persons exit (NO in step S104), the image correcting unit 16 corrects the plurality of images on an image-by-image basis (hereinafter referred to as "image-based correction") (proceeding to step S107)

If any identical person exists (YES in step S104), the feature amount similarity calculating unit 20 calculates feature amount similarity for the identical person in the plurality of images (step S105) and determines whether the images are shot under identical shooting conditions or not (step S106).

In step S105, the feature amount similarity calculating unit 20 first calculates the feature amount of the face region of the identical person.

For example, if a person A is identified in three images, RGB data average values (Rf1, Gf1, Bf1), (Rf2, Gf2, Bf2), (Rf3, Gf3, Bf3) of each face region of the person A in the three images are calculated.

The feature amount similarity calculating unit 20 then calculates the similarity of the feature amount of the face region of the identical person in each image. In the above example, the feature amounts (Rf1, Gf1, Bf1), (Rf2, Gf2, Bf2), (Rf3, Gf3, Bf3) of the person A in the three images are compared.

If the images are shot under identical shooting conditions, the face region feature amounts of the identical person obtained from the respective images should be close to each other. Therefore, whether the images are shot under identical shooting conditions or not can be determined based on whether the face region feature amounts are close to each other or not.

The feature amount similarity used for such determination may be any index as long as it can represent the similarity of face region feature amounts in a plurality of images. For example, values represented by formula (1) below may be used.

$$\text{Feature amount similarity} = 1/(Rv+Gv+Bv) \qquad (1),$$

In the above formula, Rv, Gv, Bv represent variances of the face region feature amount R, G, B components, respectively. The larger the feature amount similarity represented by formula (1), the closer the face region feature amounts in the plurality of images, therefore the higher the possibility of being shot under identical shooting conditions. In contrast, the smaller the feature amount similarity represented by formula (1), the more varied the face region feature amounts in the plurality of images, therefore the lower the possibility of being shot under identical shooting conditions.

Once the feature amount similarity is calculated, then, in step S106, the feature amount similarity is compared with threshold value previously established to determine whether or not the images are shot under identical conditions. Such threshold value may be obtained empirically.

If two or more persons are identified as the identical persons in the inputted plurality of images in steps S103 and S104, then the feature amount similarity in the plurality of images is calculated for each of the identical persons in step S105, and among the calculated values, minimum value or maximum value or average value may be compared with the threshold value.

For example, if it is extremely desirable to avoid the images that are actually shot under different conditions from being incorrectly determined as the images that are shot under identical conditions, only minimum value among the feature amount similarities of the plurality of persons may preferably be used. In contrast, if it is extremely desirable to avoid the images that are actually shot under identical conditions from being incorrectly determined as the images that are shot under different conditions, only maximum value among the feature amount similarities of the plurality of persons may preferably be used. If it is desirable to avoid both cases evenly, average value of the feature amount similarities of the plurality of persons may preferably be used.

Note, in the calculating step S105 and the determining step S106, two or more types of the feature amount similarities may be calculated using different feature amounts of the images and different formulas, and two or more threshold values corresponding to the feature amount similarities may be established and used.

In step S106, if the feature amount similarity is smaller than the threshold value, and therefore it is determined that the images are not shot under identical shooting conditions (No in step S106), the image correcting unit 16 performs image-based correction (proceeding to step S107).

If the feature amount similarity is larger than the threshold value, and therefore it is determined that the images are shot under identical shooting conditions (YES in step S106), the image correcting unit 16 corrects the plurality of images on an event-by-event basis (hereinafter referred to as "event-based correction") (proceeding to step S108).

Two correction modes performed in the image correcting unit 16, i.e., image-based correction and event-based correction will be described below.

Firstly, operation of image-based-correction (step S107) performed in the image correcting unit 16 is described.

The image correcting unit 16 first calculates a face region feature amount of each of the plurality (N) of person images inputted. For example, for the i-th (i=1, 2, 3 . . . , N) person image, average values (Rfi, Gfi, Bfi) of RGB data values in the face region are calculated.

The image correcting unit 16 then uses the previously established face region target values (hereinafter referred to as the face target value(s)) (Rft, Gft, Bft), to calculate correction gain values (gainRi, gainGi, gainBi) in the following manner. The correction gain values (gainRi, gainGi, gainBi) are for approximating the average values (Rfi, Gfi, Bfi) of RGB data values of the face region to the face target values (Rft, Gft, Bft).

In other words, first, the average values (Rfi, Gfi, Bfi) of RGB data values of the face region are converted into liner luminance signals (lrfi, lgfi, lbfi) according to formula (2) or (3). If the input image data is 8 bit, the values obtained by dividing the average values of RGB data value in the face region by 255 can be applied as the Rfi, Gfi, Bfi to formulas (2) and (3) below.

Although formulas (2) and (3) are for obtaining lrfi from Rfi, a similar manner may be used to obtain lgfi, and lbfi from Gfi, and Bfi.

$$lrfi = \begin{cases} \left(\dfrac{R\,fi + 0.055}{1.055}\right)^{2.4} & (R\,fi \geq 0.04045) \quad (2) \\ \dfrac{R\,fi}{12.92} & (R\,fi < 0.04045) \quad (3) \end{cases}$$

Also, the face target values (Rft, Gft, Bft) are converted in the same manner, using formula (2) or (3) above, into linear luminance signals (lrft, lgft, lbft)

Then, using (lrfi, lgfi, lbfi) obtained from the average values (Rfi, Gfi, Bfi) of RGB data values in the face region and (lrft, lgft, lbft) obtained from the face target values (Rft, Gft, Bft), correction gain values (gainRi, gainGi, gainBi) are calculated by formula (4) below.

$$\begin{aligned} \text{gain } R\ i &= lrft/lrfi \\ \text{gain } G\ i &= lrft/lrf \\ \text{gain } B\ i &= lrft/lrf \end{aligned} \quad (4)$$

Note that any other suitable methods may also be used for calculating the correction gain values Next, using the correction gain values as obtained above, correction is performed on the images.

The image correcting unit 16 first converts the data values (pixel values) of the inputted person images into luminance linear signals.

For example, in case of the input data is 8 bit, if values obtained by dividing the input data by 255 are (Rin, Gin, Bin), lr0 for Rin is calculated using formula (5) or (6) below.

$$lr0 = \begin{cases} \left(\dfrac{R\,in + 0.055}{1.055}\right)^{2.4} & (R\,in \geq 0.04045) \quad (5) \\ \dfrac{R\,in}{12.92} & (R\,in < 0.04045) \quad (6) \end{cases}$$

lg0 and lb0 are also calculated from Gin and Bin using similar formulas.

The image correcting unit 16 then performs correction (gain correction) on (lr0, lg0, lb0) as obtained in the above, using the modification values (gainR, gainG, gainB) of antilogarithms to obtain (lr1, lg1, lb1)

$$\begin{aligned} lr1 &= lr0 \times \text{gain } R\ i \\ lg1 &= lg0 \times \text{gain } G\ i \\ lb1 &= lb0 \times \text{gain } B\ i \end{aligned} \quad (7)$$

The image correcting unit 16 finally converts the corrected signals (lr1, lg1, lb1) again into signals multiplied by gamma, to obtain values (Rout, Gout, Bout). Rout for lr1 is calculated using formula (8) or (9).

$$R\text{ out} = \begin{cases} 1.055 \times lr1^{(1.0/2.4)} - 0.055 & (lr1 \geq 0.0031308) \quad (8) \\ 12.92 \times lr1 & (lr1 < 0.0031308) \quad (9) \end{cases}$$

Gout and Bout are also calculated from lg1 and lb1, using similar formulas.

If outputting the corrected images in 8 bit, Rout, Gout, Bout are multiplied by 255 to obtain output data values.

In the above, the input data values (corresponding Rin, Gin, Bin) and the output data values (corresponding Rout, Gout, Bout) are values for one pixel. Therefore, similar calculation is repeated for all of the pixels of the image to be corrected.

In this way, using the correction gain values (gainRi, gainGi, gainBi) calculated for the i-th image, the i-th image is corrected. In other words, in performing image-based correction, correction is performed by calculating correction values on an each image basis.

If a plurality of persons are photographed in the image to be corrected, correction may be performed by using average values of the correction gain values obtained on an each face region and each person basis.

It should be noted that, in this embodiment, the image data is processed according to the sRGB standard, however, other signaling standards (such as ITU-R. BT709) may be used. In such cases, appropriate formulas conforming to respective signaling standards may be used instead of using formulas (5), (6), which perform conversion from the input data values to linear luminance signals, or formulas (8), (9), which perform reverse conversion.

Secondly, operation of event-based correction (step S108) performed in the image correcting unit 16 is described.

The image correcting unit 16, similar to image-based correction described above, calculates correction gain values (gainRi, gainGi, gainBi) (i=1, 2, 3 . . . , N) for each of the plurality (N) of person images inputted.

The image correcting unit 16 then calculates average values (gainRav, gainGav, gainBav) of the correction gain values (gainRi, gainGi, gainBi) for each of the all person images and corrects all the images using such identical correction gains (gainRav, gainGav, gainBav). In other words, for event-based correction, an identical correction is performed to all of the images.

Processes of correcting images using the correction gain values are the same as used for image-based correction described above.

All of the plurality of images are corrected through image-based correction or event-based correction, as has been described heretofore, and the corrected images are outputted (step S109).

The corrected images outputted from the person image correcting apparatus 10 are sent to a digital photo printer for printing. Alternatively, the corrected images may be sent to a display unit on which the images are displayed or to a recording device such as media driver in which the image data is stored.

It should be noted that, in the above example, the feature amount in the face region (average values (Rfi, Gfi, Bfi) of RGB data in the face region) is calculated in the feature amount similarity calculating unit 20 of the identical shooting condition determining unit 14 for the purpose of obtaining the similarity of the face region feature amount of an identical person, and is also calculated in the image correcting unit 16 for the purpose of obtaining correction gain values. However, the person image correcting apparatus 10 may have a calculating unit for calculating the face region feature amount, separately, so that calculation results from the calculating unit can be used by both the feature amount similarity calculating unit 20 and the image correcting unit 16. Such configuration contributes to reduced computing time.

In addition, in the above described example, as the feature amount in the face region, average values of the RGB data in the face region are used. However, the present invention is not limited to this, and other suitable values may be used as the feature amount. In order to ensure the accuracy in correction, it is preferable to use average values and median values as the typical values, because such values are relatively stable. In addition to those values, maximum values, for example, may be combined to further improve the accuracy.

Another embodiment of the present invention will be described below.

In the above described embodiment, the identical shooting condition determining unit 14 of the person image correcting unit 10 determines whether or not the images are shot under identical conditions by using thresholds based on the feature amount similarity calculated by the feature amount similarity calculating unit 20, and the image correcting unit 16 switches the correction mode between image-based correction mode and event-based correction mode according to a result of the determination.

In contrast, in this embodiment, both correction modes may be combined. Image correction may be performed by changing weight between the two modes, depending on the feature amount similarity.

Figure 3:
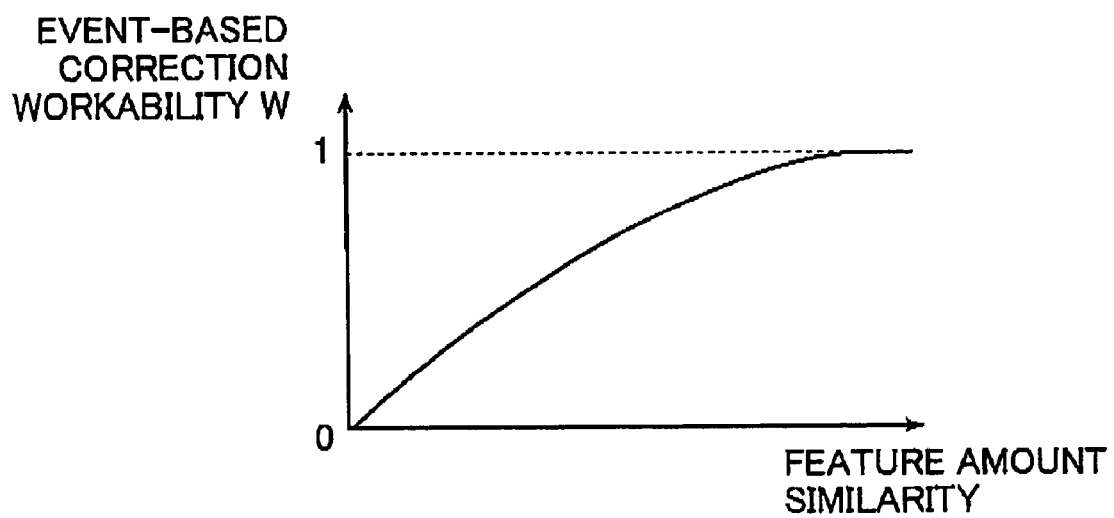
FIG. 3 is a chart showing a relation between feature amount similarity and event-based correction workability W.

For example, as shown in FIG. 3, a relation between the feature amount similarity and the event-based correction workability W is previously obtained. The event-based correction workability w represents the degree of workability of the event-based correction and is a value between 0 and 1. The event-based correction workability W has a monotone increasing relation with the feature amount similarity.

The identical shooting condition determining unit 14 calculates the event-based correction workability W according to the feature amount similarity calculated in the feature amount similarity calculating unit 20 and sends the calculated event-based correction workability W to the image correcting unit 16.

If no identical persons are identified among the plurality of images by the feature amount similarity calculating unit 20, and therefore no clues are found in determining whether or not the images are shot under identical conditions, a predetermined fix value such as 0 or 0.5 may be used as the event-based correction workability W.

The image correcting unit 16 operates in the following manner according to the event-based correction workability W.

The correction values (gainRi, gainGi, gainBi) calculated for the i-th image, the average values (gainRav, gainGav, gainBav) of the correction gain values (gainRi, gainGi, gainBi) calculated for all of the images and the event-based correction workability W are used to calculate correction gain values (gainRwi, gainGwi, gainBwi) by formula (10) below. The correction gain values thus obtained are to be finally used in correcting the i-th image $$\left.\begin{array}{l}\text{gain } R \ wi = (1-w) \times \text{gain } R \ i + w \times \text{gain } R \ av \\ \text{gain } G \ wi = (1-w) \times \text{gain } G \ i + w \times \text{gain } G \ av \\ \text{gain } B \ wi = (1-w) \times \text{gain } B \ i + w \times \text{gain } B \ av\end{array}\right\} \quad (10)$$

If the event-based workability W is 1, calculation using formula (10) is as follows.

$$\left.\begin{array}{l}\text{gain } R \ wi = \text{gain } R \ av \\ \text{gain } G \ wi = \text{gain } G \ av \\ \text{gain } B \ wi = \text{gain } B \ av\end{array}\right\} \quad (11)$$

As a result, event-based correction is performed.

If the event-based workability W is 0, calculation using formula (10) is as follows.

$$\left.\begin{array}{l}\text{gain } R \ wi = \text{gain } R \ i \\ \text{gain } G \ wi = \text{gain } G \ i \\ \text{gain } B \ wi = \text{gain } B \ i\end{array}\right\} \quad (12)$$

As a result, image-based correction is performed.

If 0<w<1, intermediate correction between event-based correction and image-based correction is performed. In other words, both event-based correction and image-based correction are performed by applying variable weights determined by the event-based correction workability W.

As described above, this embodiment prevents inappropriate correction resulted from erroneous determination that could occur where it is difficult to determine whether or not the images are shot under identical conditions, for example, where no identical persons are identified by the identical person identifying unit 18, where the identical person is identified in too few images compared to the total number of images to be corrected, or where even if the identical person is identified, the feature amount similarity is too close to the threshold as provided in the above embodiment. In either case, this embodiment ensures that correction is performed so that the images are reproduced with acceptable image qualities.

Next, still another embodiment of the invention will be described.

In either of the embodiments described above, the identical shooting condition determining unit 14 of the person image correcting apparatus 10 determines whether or not the images are shot under identical conditions, using feature amount similarities of identical persons.

However, there may be cases where it is not sufficient if determination is performed with the feature amount similarity only. In addition, if no identical persons exist, determination becomes impossible.

Figure 4:
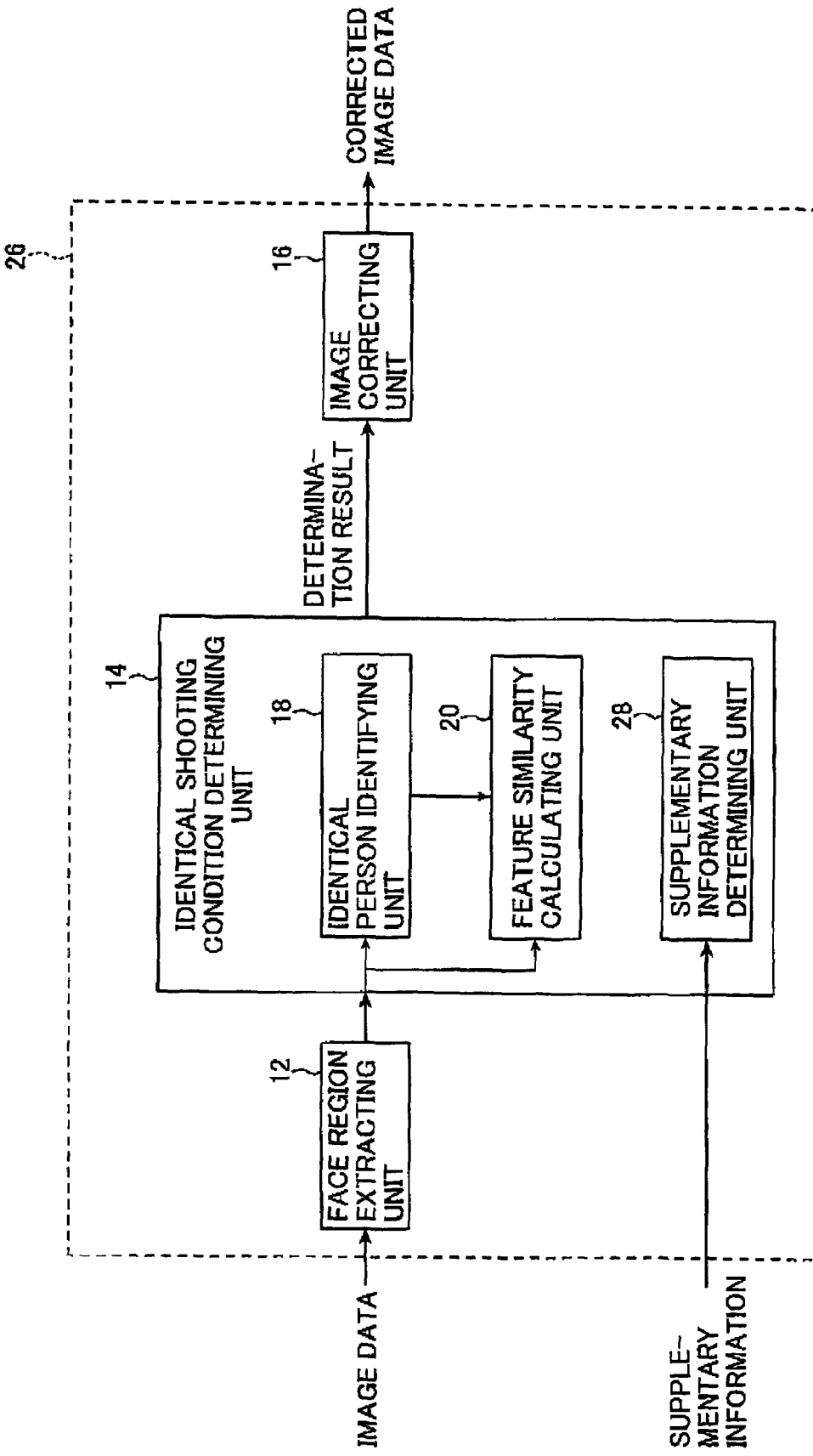
FIG. 4 is a block diagram of another embodiment of the person image correcting apparatus of the present invention.

This embodiment provides, on top of other embodiments described above, a configuration to allow the identical shooting condition determining unit 14 to utilize supplementary information of the image data, in determination of whether or not the images are shot under identical conditions or in calculation of the event-based correction workability W. In the person image correcting apparatus 26 shown in FIG. 4, the identical shooting condition determining unit 14 has a unit 28 for determining the supplementary information, in addition to the identical person identifying unit 18 and the feature amount similarity calculating unit 20.

For example, when the image data is inputted to the person image correcting apparatus 10, supplementary information thereof is also inputted. Examples of such supplementary information include camera model designation, shooting date, shutter speed, aperture-setting, shooting mode, white balance, and other information related to the camera used for the shooting.

In the supplementary information determining unit 28 of the identical shooting condition determining unit 14, an identical shooting condition probability P is established from the pieces of supplementary information, which is then used, together with the feature amount similarity, to determine whether or not the images are shot under identical conditions or to calculate the event-based correction workability W.

For example, as the identical shooting condition probability P, a plurality of identical shooting condition probabilities from P1 to P6 shown in Table 1 are established, and the total points of these probabilities are considered in determining whether or not the images are shot under identical conditions or in calculating the event-based workability W.

In other words, each of the identical shooting condition probabilities P1 to P6 is a number between 0 and 1. For example, if the camera model designation obtained from the supplementary information is the same, the identical shooting condition probability P is set to 1. If the range of shooting dates is small, a higher value is set as the identical shooting condition probability p2. In addition, if the shutter speed is the same, the identical shooting condition probability p3 is set to 1, if the aperture-setting is the same, the identical shooting condition probability p4 is set to 1, if the shooting mode is the same, the identical shooting condition probability p5 is set to 1, and if the white balance is the same in case of digital cameras, the identical shooting condition probability p6 is set to 1.

TABLE 1

| | Supplementary information | Identical Shooting condition Probability p |
|---|---|---|
| 1 | Camera Model Designation | If the camera model designation is the same, P1 = 1 |
| 2 | Shooting Date | If the range of shooting dates is smaller, P2 is set to a higher value. |
| 3 | Shutter Speed | If the shutter speed is the same, P3 = 1. |
| 4 | Aperture-Setting | If the aperture-setting is the same, P4 = 1. |

TABLE 1-continued

| | Supplementary information | Identical Shooting condition Probability p |
|---|---|---|
| 5 | Shooting Mode | If the shooting mode is the same, P5 = 1. |
| 6 | White Balance | If the white balance is the same, P6 = 1. |

As the supplementary information, at least one item of supplementary information described above may be used. In order to improve appropriateness in determining of the identical shooting condition probability, it is preferable to use as many items of the above supplementary information as possible information other than the above may also be used. Among the above supplementary information, the camera model designation, the shooting date, the shutter speed, and the white balance are particularly useful in determining the identical shooting condition probability, therefore, it is preferable to use at least these items.

In addition, in each of the above described embodiments, the identical shooting condition determining unit 14 may calculate, when calculating the feature amount similarity through the feature amount similarity calculating unit 20, not only the feature amount similarity of the face region of the identical person, but also other information such as feature amount similarity of background regions, and use them in identical shooting condition determination.

Using the feature amount in the background regions allows determination of whether or not the images are shot under identical conditions from the feature amount of the images, even if no identical persons are identified.

Background regions to which the feature amount is calculated include, the background region excluding the face region of the person, the background region excluding the person as a whole (face and body), and the background region excluding the person and other subjects shot in the image and therefore being substantially in a same color. The feature amount similarity of the entire image including the person may be used as well.

Next, still another embodiment of the present invention will be described.

In each of the above described embodiments, the identical shooting condition determining unit 14 of the person image correcting apparatus 10 has the identical person identifying unit 18 and the feature amount similarity calculating unit 20, and determines whether or not the images are shot under identical conditions, by paying attention to persons in the image.

However, the present invention is not limited to this, and it is possible to determine whether or not the images are shot under identical conditions, without using the person information.

Figure 5:
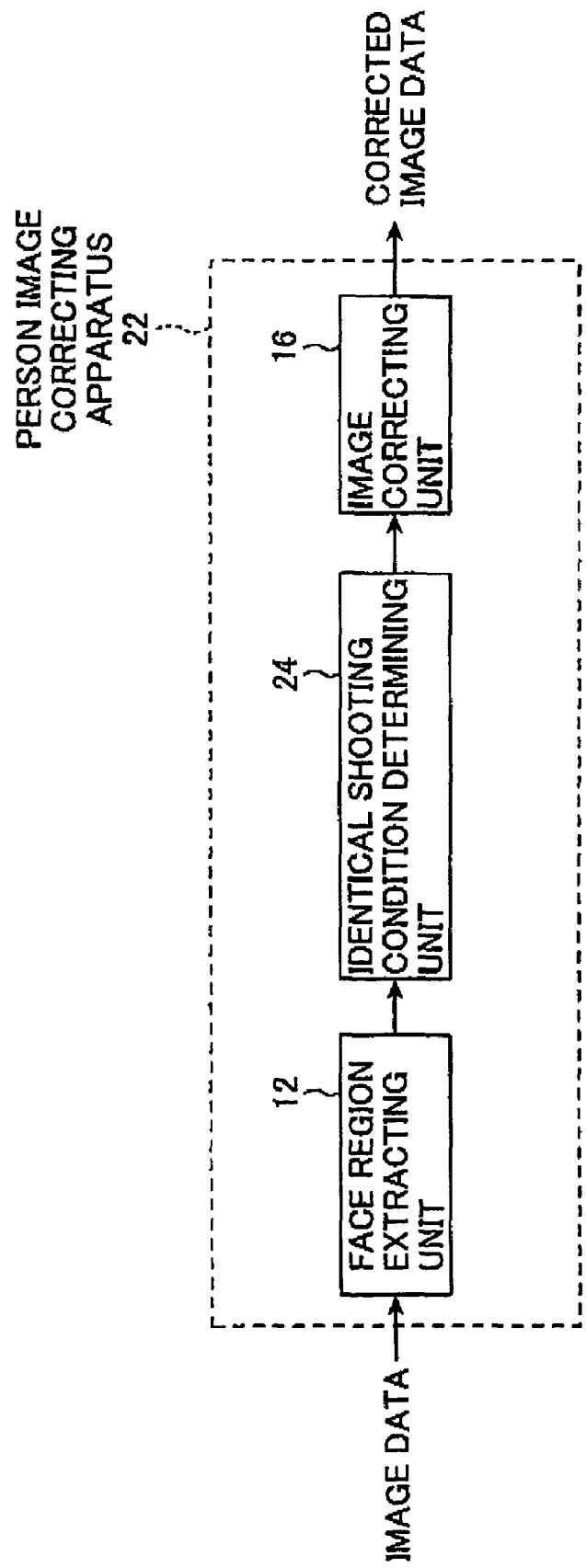
FIG. 5 is a block diagram of another embodiment of the person image correcting apparatus of the present invention.

In the person image correcting apparatus 22 shown in FIG. 5, the identical shooting condition determining unit 24 uses one or combination of the supplementary information of the image data described above, and the feature amount similarity of the background regions or the entire image to determine whether or not the images are shot under identical conditions.

In other words, the identical shooting condition determining unit 24 has at least one of the feature amount similarity unit that calculates the feature amount of the background regions or the entire image to calculate the feature amount similarity in each image, and the supplementary information determining unit that obtains the identical shooting condition probability P by determining the supplementary information.

The face region extracting unit 12 and the image correcting unit 16 of the person image correcting apparatus 22 have a configuration similar to the person image correcting apparatus 10 in FIG. 1. The image correcting unit 16 performs either one of image-based correction and event-based correction, according to the result of the determination provided by the identical shooting condition determining unit 24 so that the face region extracted by the face region extracting unit 12 is reproduced with appropriate colors and densities.

When using both correction modes according to the event-based correction workability W, the event-based correction workability W is calculated in the identical shooting condition determining unit 24 in the similar manner as described above, and correction is performed by the image correcting unit 16 according to the event-based correction workability W.

It should be noted that although in each of the above described embodiments, both of the color and density are corrected, the present invention is not limited to this, and either one of color and density may be corrected.

The person image correcting apparatus, the person image correcting method, and the person image correcting program of the present invention have been fully described in detail heretofore. However, it should be noted that the present invention is not limited to the embodiments described above, and any improvements and modifications may be incorporated unless otherwise such modification and improvements depart from the scope of the invention.

What is claimed is:

1. A person image correcting apparatus for correcting a plurality of person images, the person image correcting apparatus comprising:
    a face region extracting unit for extracting a face region from the plurality of person images that are inputted;
    an identical shooting condition determining unit for determining whether or not the plurality of person images are shot under identical shooting conditions; and
    an image correcting unit for correcting at least one of color and density of the person images using information of the face region extracted by the face region extracting unit based on a result of determination of the identical shooting condition determining unit.

2. The person image correcting apparatus according to claim 1, the identical shooting condition determining unit comprising:
    an identical person identifying unit for identifying an identical person among persons shot on the plurality of person images; and
    a feature amount similarity calculating unit for calculating a feature amount similarity of the identical person identified by the identical person identifying unit,
    wherein, the identical shooting condition determining unit determines, based on the feature amount similarity calculated by the feature amount similarity calculating unit, whether or not the plurality of person images are shot under identical shooting conditions.

3. The person image correcting apparatus according to claim 1, wherein if the determination indicates that the plurality of person images are shot under identical shooting conditions, the image correcting unit corrects all of the plurality of person images with an identical correction amount and if the determination indicates that the plurality of person images are not shot under identical conditions, the image correcting unit corrects the respective plurality of person images with respective correction amounts.

4. The person image correcting apparatus according to claim 1, wherein the face region extracting unit extracts a plurality of face regions of different persons from the plurality of person images which are being input.

5. The person image correcting apparatus according to claim 4, wherein the identical shooting condition determining unit comprises:
    an identical person identifying unit which identifies identical persons based on the extracted face regions.

6. The person image correcting apparatus according to claim 5, wherein the identical shooting condition determining unit comprises:
    a feature amount similarity calculating unit which calculates a feature amount similarity of each identified identical person, wherein whether the person images containing the identical person are shot under the identical shooting conditions is determined based on the feature amount similarity.

7. The person image correcting apparatus according to claim 6, wherein the image correcting unit determines correction values for each image of at least one of color and density in each image independently from the rest of the images, if one of:
    no identical person is identified in the input person images, and
    the person images containing the identical person are not shot under the identical shooting conditions, as determined based on the feature amount similarity.

8. A person image correcting method comprising the steps of:
    extracting a face region from a plurality of person images that are inputted,
    determining whether or not the plurality of person images are shot under identical shooting conditions, and
    correcting at least one of color and density of the person images, by using information of the extracted face region, based on a result of the determining step.

9. The person image correcting method according to claim 8, wherein the determining step includes:
    identifying an identical person among persons shot on the plurality of person images;
    calculating a feature amount similarity of the identified identical person; and
    performing determination based on the calculated feature amount similarity.

10. The person image correcting method according to claim 8, wherein if the determination indicates that the plurality of person images are shot under identical shooting conditions, all of the plurality of person images are corrected with an identical correction amount and if the determination indicates that the plurality of person images are not shot under identical conditions, the respective plurality of person images are corrected with respective correction amounts.

11. A tangible computer-readable medium which stores a person image correcting program which, when executed by a computer, causes the computer to serve as:
    a face region extracting unit for extracting a face region from the plurality of person images that are inputted;
    an identical shooting condition determining unit for determining whether or not the plurality of person images are shot under identical shooting conditions; and
    an image correcting unit for correcting at least one of color and density of the person images using information of the face region extracted by the face region extracting unit based on a result of determination of the identical shooting condition determining unit.

12. A tangible computer-readable medium which stores a person image correcting program which, when executed by a computer, causes the computer to perform:
- extracting a face region from a plurality of person images that are inputted,
- determining whether or not the plurality of person images are shot under identical shooting conditions, and
- correcting at least one of color and density of the person images, by using information of the extracted face region, based on a result of the determining step.

13. An apparatus for correcting a plurality of person images comprising:
- a face region extracting means for extracting a face region from the plurality of person images that are inputted;
- an identical shooting condition determining means for determining whether the plurality of person images are shot under identical shooting conditions; and
- an image correcting means for correcting at least one of color and density of the person images using information provided by the extracted face region means, based on a result of determining.

14. The apparatus according to claim 13, wherein the identical shooting condition means comprises:
- an identical person identifying means for identifying an identical person among persons shot in the plurality of person images; and
- a feature amount similarity calculating means for calculating a feature amount similarity of the identified identical person,
- wherein the identical shooting condition determining means determines whether the plurality of person images are shot under identical shooting conditions based on the calculated feature amount similarity.

* * * * *